(12) United States Patent
Dwyer

(10) Patent No.: US 6,598,432 B1
(45) Date of Patent: Jul. 29, 2003

(54) TRAILER HITCH LOCK

(76) Inventor: John A. Dwyer, 513 Mantua Blvd., Sewell, NJ (US) 08080

( * ) Notice: Subject to any disclaimer, the term of this patent is extended or adjusted under 35 U.S.C. 154(b) by 0 days.

(21) Appl. No.: 10/174,834

(22) Filed: Jun. 19, 2002

(51) Int. Cl.[7] .............................................. E05B 73/00
(52) U.S. Cl. ................................. 70/14; 70/58; 70/258; 70/232; 280/507
(58) Field of Search ............................ 70/14, 58, 232, 70/258; 280/507

(56) References Cited

U.S. PATENT DOCUMENTS

| | | | |
|---|---|---|---|
| 2,641,124 A | 6/1953 | Gallagher et al. | 70/232 |
| 2,656,706 A | 10/1953 | Lucas et al. | 70/232 |
| 3,226,133 A | 12/1965 | Geresy | 280/507 |
| 3,233,913 A | 2/1966 | Brown | 280/507 |
| 3,269,159 A | 8/1966 | Young | 70/232 |
| 3,434,741 A | 3/1969 | Grant | 280/507 |
| 3,605,457 A | 9/1971 | Foster | 70/14 |
| 3,606,423 A | 9/1971 | McCarthy | 292/148 |
| RE28,187 E | 10/1974 | Longenecker | 280/507 |
| 3,884,055 A | 5/1975 | Vuillemot | 70/58 |
| 4,039,202 A | 8/1977 | Bamettler | 280/507 |
| 4,186,575 A * | 2/1980 | Bulle | 70/14 |
| 4,191,034 A | 3/1980 | Froess et al. | 70/258 |
| 4,376,544 A * | 3/1983 | Sette et al. | 280/507 |
| 4,380,160 A * | 4/1983 | Hoffman | 70/14 |
| 4,440,005 A * | 4/1984 | Bulle | 70/14 |
| 4,480,450 A * | 11/1984 | Brown | 70/14 |
| 4,774,823 A | 10/1988 | Callison | 70/14 |
| 5,063,759 A | 11/1991 | Nee et al. | 70/14 |
| 5,332,251 A * | 7/1994 | Farquhar | 280/507 |
| 5,343,720 A * | 9/1994 | Slater | 70/14 |
| D417,133 S * | 11/1999 | Niswanger | D8/331 |
| 6,412,313 B1 * | 7/2002 | Bernstrom | 70/14 |
| 6,412,314 B1 * | 7/2002 | Jenks | 70/14 |
| 6,434,982 B1 * | 8/2002 | Rowland | 70/232 X |
| 6,467,317 B1 * | 10/2002 | Hillabush et al. | 280/507 X |

* cited by examiner

*Primary Examiner*—Suzanne Dino Barrett
(74) *Attorney, Agent, or Firm*—Norman E. Lehrer

(57) ABSTRACT

A trailer hitch lock is disclosed that is particularly useful for preventing the theft of trailers that utilize pintle-type hitches. The lock includes a pair of steel plates which are hinged at one end. An upstanding steel projection is located substantially at the center of the interior of one of the plates. When the plates are pivoted toward their closed position, the pin fits within the opening of the trailer hitch pintle. The forward end of each of the plates includes a flat steel locking flange extending toward the other plate. Each steel locking flange has a hole passing therethrough which cooperates with the other when the plates are in their closed positions so that a padlock can be passed therethrough to maintain the device in a closed position. Located to either side of these cooperating locking flanges are a further pair of steel guards which protect the padlock by preventing a cutting tool from reaching the padlock.

6 Claims, 1 Drawing Sheet

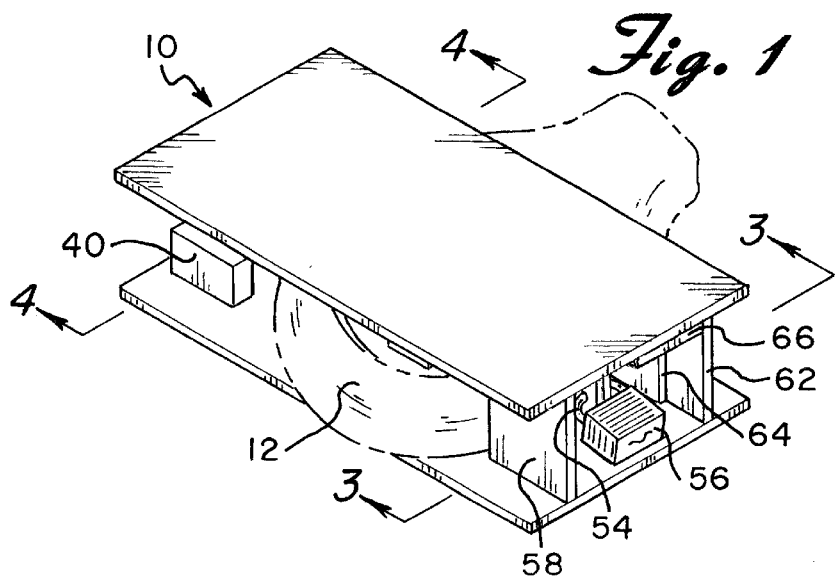
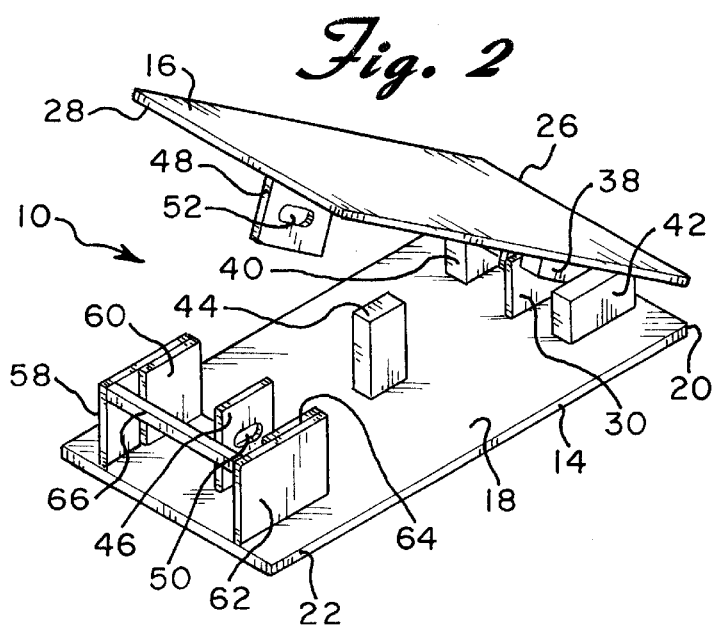
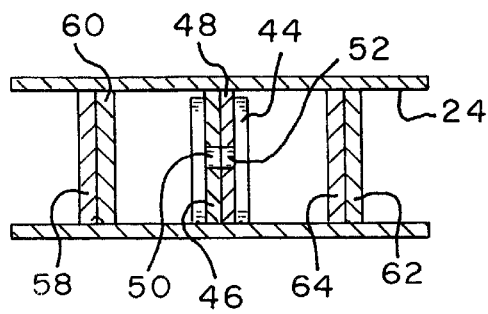
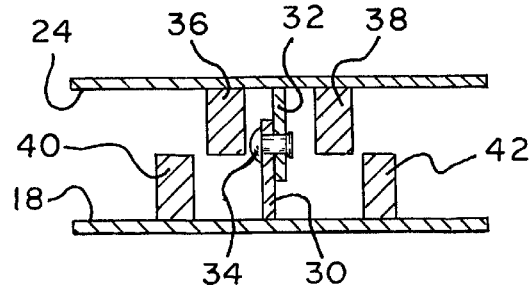

TRAILER HITCH LOCK

BACKGROUND OF THE INVENTION

The present invention is directed toward a locking mechanism and, more particularly, toward a lock for a trailer hitch which is intended to prevent the theft of trailers or similar vehicles.

Many trailer hitches used in trailers for carrying construction equipment and the like and recreational types of trailers such as boat trailers, campers and the like employ standard hitch mechanisms in the form of a socket or the like comprised of a hitch pintle or welded bar which is adapted to engage a standard jaw hitch or eye assembly carried by a towing vehicle. While standard hitching mechanisms such as these have many advantages such as the interchangeability of trailer hitches thereby allowing different vehicles to tow different types of trailers, this also creates several disadvantages. Most particularly, standardizing these hitch mechanisms allows any person having a standard pintle hitch on his vehicle to easily steal an unattended and unattached trailer by simply attaching the trailer to his vehicle and towing the same away. A number of prior art devices have been proposed in the past for protecting trailer hitches in order to prevent the theft thereof. These are shown, for example, in U.S. Pat. Nos. 3,226,133; 3,233,913; 3,434,741; 3,605,457 and 3,884,055. These patents, however, are directed primarily toward trailer hitches of the ball type and provide relatively complex mechanisms for protecting the same.

U.S. Pat. No. 5,063,759 describes a security device for a trailer hitch which appears to provide significant protection but, again, is useful only with a ball-type hitch and only with those of particular construction having an outwardly extending flange. This patent does, however, utilize a standard padlock which is well protected by the device so as to prevent unauthorized access thereto.

The only patent of which Applicant is aware that is directed toward a device for preventing the theft of trailers and which can be utilized with a pintle type of hitch is U.S. Pat. No. 4,774,823. This patent shows several embodiments, one of which is specifically directed toward a pintle hitch. While the device shown in this patent may be somewhat useful, the padlock utilized with the anti-theft mechanism is exposed and can be easily tampered with by a prospective thief. It is, therefore, not believed that this prior device would be effective in preventing the theft of a trailer to which it is attached as the locking mechanism can be easily removed utilizing a cutter or saw or the like.

SUMMARY OF THE INVENTION

The present invention is designed to overcome the deficiencies of the prior art discussed above. It is an object of the present invention to provide a trailer hitch lock that is particularly useful with a pintle-type trailer hitch.

It is another object of the present invention to provide a trailer hitch lock that is useful with a pintle-type trailer hitch and which effectively locks the same to prevent the unauthorized use or theft of the trailer.

It is a further object of the present invention to provide a trailer hitch lock for a pintle-type trailer hitch which can be easily locked into place but which cannot be removed by anyone other than the owner thereof.

In accordance with the illustrative embodiment demonstrating features and advantages of the present invention, there is provided a trailer hitch lock for use with a pintle-type trailer hitch. The trailer hitch lock includes a pair of steel plates which are hinged at one end. An upstanding steel projection is located substantially at the center of the interior of one of the plates. When the plates are pivoted toward their closed position, the pin fits within the opening of the trailer hitch pintle. The forward end of each of the plates includes a piece of flat steel extending toward the other plate. Each piece of steel has a hole passing therethrough which cooperates with the other when the plates are in their closed positions so that a padlock or the like can be passed therethrough to maintain the device in its closed position. Located to either side of these cooperating smaller steel plates are a further pair of steel plates which protect the padlock by preventing a cutting tool or the like from reaching the same.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a front perspective view of the trailer hitch lock of the present invention, with a portion broken away for clarity, showing the same secured to the pintle hitch of a trailer;

FIG. 2 is a perspective view of the trailer hitch lock of FIG. 1 showing the same in its partially opened position;

FIG. 3 is a cross-sectional view taken through line 3—3 of FIG. 1, and

FIG. 4 is a cross-sectional view taken through line 4—4 of FIG. 1.

DETAILED DESCRIPTION OF THE PREFERRED EMBODIMENT

Referring now to the drawings in detail wherein like reference numerals have been used throughout the various figures to designate like elements, there is shown in FIGS. 1 and 2 a trailer hitch lock constructed in accordance with the principles of the present invention and designated generally as 10. FIG. 1 shows the trailer hitch lock 10 assembled on the pintle 12 of a trailer hitch while FIG. 2 shows the trailer hitch lock 10 in its partially open position.

The trailer hitch lock 10 is comprised essentially of a lower substantially rectangularly shaped steel plate 14 and an upper substantially rectangularly shaped steel plate 16. Upper and lower steel plates 14 and 16 are preferably of the same size which may be 6 inches wide by 12 inches long by ¼ inch thick. This is, of course, by way of example only as it should be readily apparent to those skilled in the art that other sizes may also be useful. Lower plate 14 has an inner surface 18, a rear end 20 and a forward end 22. Similarly, the upper steel plate 16 has an inner surface 24 (see FIGS. 3 and 4) a rear end 26 and a forward end 28.

As shown best in FIGS. 2 and 4, the plates 14 and 16 are hinged together adjacent the rear ends 20 and 26 thereof so that the plates can be moved between an inoperative, open position as shown in FIG. 2 and an operative, closed position as shown in FIG. 1. The hinge is comprised of a lower flange 30 in the form of a small, rectangular plate welded to the inner surface 18 of the lower plate 14 and a similar flange 32 also comprised of steel welded to the inner surface 24 of the upper plate 16. The hinge flanges 30 and 32 are preferably located adjacent the center line of the upper and lower plates and are pivoted together through the use of a pivot pin which may be in the form of a rivet 34 or the like. Guards in the form of steel blocks 36, 38, 40 and 42 are welded to the inner surfaces 18 and 24 of the lower and upper plates 14 and 16, respectively, on either side of the hinge so as to prevent access to the area of the hinge by a cutting tool or the like when the plates 14 and 16 are in their closed, operative position as shown in FIG. 1.

A steel pin 44 extends upwardly from the inner surface 18 of the lower plate 14 substantially at the center thereof. While the pin 44 is shown as being substantially rectangular in shape, it should be readily apparent that it can be of substantially any cross-sectional shape. The height of the pin, however, is substantially equal to the distance between the plates 14 and 16 when they are in their closed, operative position.

Although the pin 44 is shown welded to the inner surface 18 of the plate 14, it should be readily apparent that it could alternatively be welded to the inner surface 24 of the upper plate 16 and extend downwardly. And it is not beyond the scope of the present invention to form the pin 44 in two parts of equal length but of approximately half the cross-sectional shape so that the pin is formed by two half pins with one being welded to the surface 18 and the other welded to the surface 24.

A steel locking flange 46 is welded to the inner surface 18 of the plate 14 adjacent the forward end 22 thereof. A similar locking flange 48 extends downwardly from the inner surface 24 of the upper plate 16. Each of these locking flanges 46 and 48 includes an elongated opening 50 and 52 formed therein, respectively, which are arranged transversely to the length of the plates 14 and 16. When the plates 14 and 16 are in their closed, operative position, the openings 50 and 52 are in alignment with each other as shown in FIG. 3.

The locking flanges 46 and 48 are utilized to lock the lower and upper plates 14 and 16 into their closed, operative position. This is accomplished by first closing the two plates, i.e. pivoting them into positions shown in FIGS. 1 and 3, so that the openings 50 and 52 are in alignment and then inserting the shackle 54 of the padlock 56 therethrough. This, however, is not normally done until after the pintle 12 of the hitch is placed over the pin 44.

In order to prevent access to the shackle 54 of the lock 56 by a cutting tool or the like, a plurality of steel guards 58, 60, 62 and 64 are welded to the inner surface 18 of the lower plate 14 adjacent the forward end 22 thereof. There are essentially two pairs of guards with the guards 58 and 60 being located on the left of the locking flanges 46 and 48 and guards 62 and 64 being located to the right of the locking flanges 46 and 48. The guards are spaced sufficiently far enough from each other to allow room for the padlock 56 to be inserted therebetween. A reinforcing bar 66 extends between the two pairs of guards adjacent the upper front thereof in order to provide additional protection. Only a portion of this steel reinforcing bar 66 is shown in FIG. 1. The remaining portion is not shown in the drawing merely for clarity. It should be readily understood, however, that the reinforcing bar extends all the way across between the two sets of guards as shown in FIG. 2.

The present invention may be embodied in other specific forms without departing from the spirit or essential attributes thereof and accordingly, reference should be made to the appended claims rather than to the foregoing specification as indicating the scope of the invention.

I claim:

1. A trailer hitch lock comprising:

a lower, substantially rectangularly shaped metal plate having a lower inner surface;

an upper, substantially rectangularly shaped metal plate having an upper inner surface;

each of said lower and upper plates having a rear end and a forward end;

hinge means carried by said plates adjacent the rear ends thereof whereby said plates are hinged together and are pivotally moveable with respect to each other between an open inoperative position and a closed operative position wherein said plates are spaced apart but substantially parallel to each other;

a metal pin secured to and extending away from one of said inner surfaces, said metal pin having a height which is substantially equal to the distance between said plates when the plates are in their closed operative position;

an upper locking flange secured to said upper inner surface adjacent the forward end of said upper plate and a lower locking flange secured to said lower inner surface adjacent the forward end of said lower plate, said locking flanges being positioned substantially next to each other when said plates are in their closed operative position;

each of said locking flanges having a transverse opening therein, said openings being in alignment with each other when said plates are in their closed operative position, and a pair of metal guards secured to one of said inner surfaces and extending toward said other inner surface, said metal guards being spaced from each other and being located adjacent said forward end of said plates and on either side of said locking flanges.

2. A trailer hitch lock as claimed in claim 1 wherein said pin is secured to and extends from said lower inner surface toward said upper inner surface.

3. A trailer hitch lock as claimed in claim 1 wherein said metal includes steel.

4. A trailer hitch lock as claimed in claim 1 wherein each opening in each of said locking flanges is elongated to aid in the insertion of the shackle of a padlock therethrough.

5. A trailer hitch lock as claimed in claim 4 wherein said metal guards are spaced from each other by a distance sufficient to permit space for said padlock.

6. A trailer hitch lock as claimed in claim 1 further including a reinforcing metal bar extending between said metal guards.

* * * * *